No. 727,696. PATENTED MAY 12, 1903.
B. L. SANDERS.
PNEUMATIC SPRING.
APPLICATION FILED APR. 23, 1902.
NO MODEL.
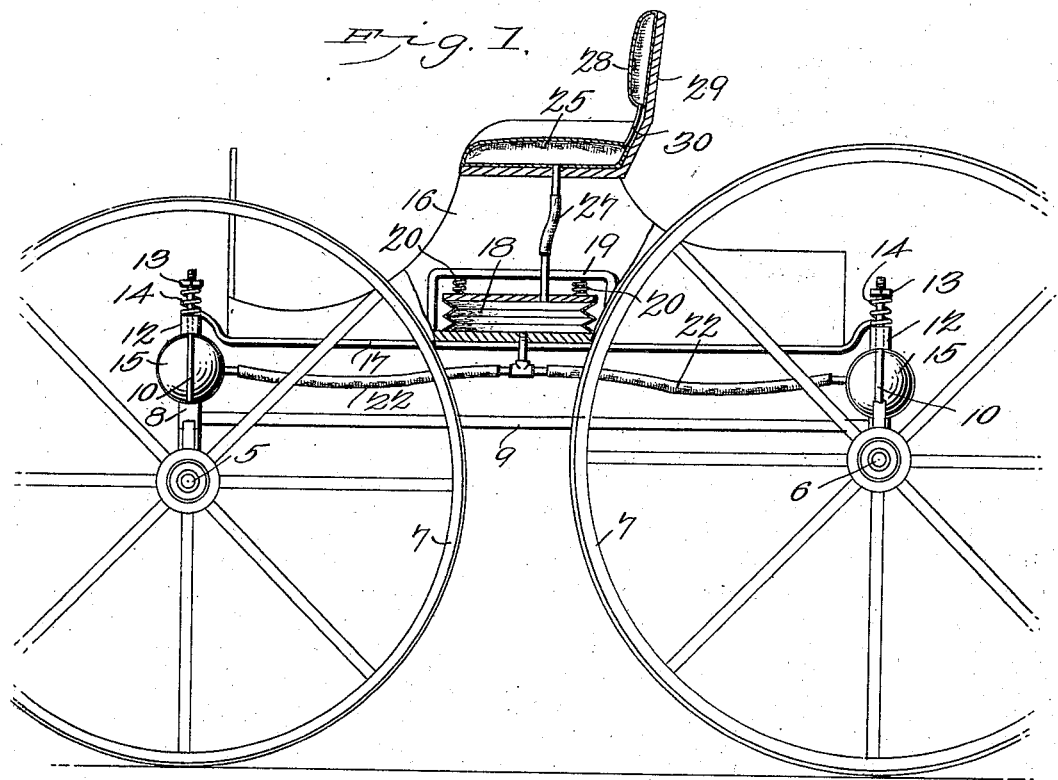
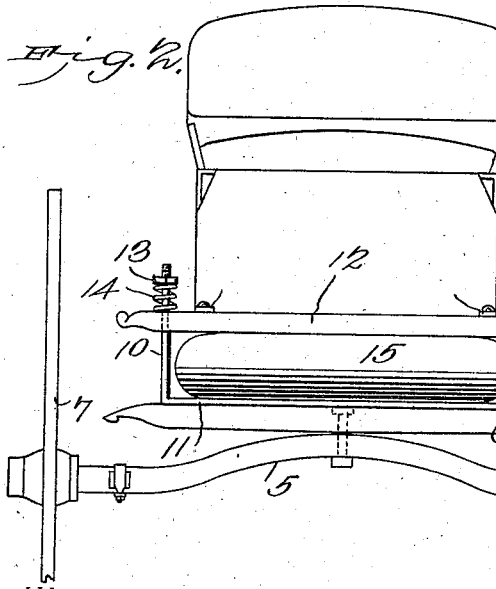
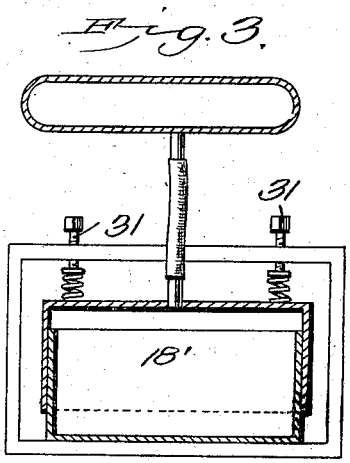
Witnesses
B. L. Sanders, Inventor.
by
Attorneys No. 727,696. Patented May 12, 1903.

UNITED STATES PATENT OFFICE.

BURRUS LAFFAYETTE SANDERS, OF DALTON, GEORGIA, ASSIGNOR OF FIVE-EIGHTHS TO A. B. MASON, OF FLORENCE, ALABAMA, AND W. S. SANDERS, OF DALTON, GEORGIA.

PNEUMATIC SPRING.

SPECIFICATION forming part of Letters Patent No. 727,696, dated May 12, 1903.

Application filed April 23, 1902. Serial No. 104,348. (No model.)

*To all whom it may concern:*

Be it known that I, BURRUS LAFFAYETTE SANDERS, a citizen of the United States, residing at Dalton, in the county of Whitfield and State of Georgia, have invented a new and useful Pneumatic Spring, of which the following is a specification.

This invention relates to certain improvements in pneumatic springs or yielding devices in which a compressible fluid is employed to take up a strain or shock or to form a yielding support for a weight.

The principal object of the invention is to construct a device of this character in which the air-pressure may be augmented and the yielding rendered more uniform by the employment of an auxiliary air-supply constantly held under pressure by mechanical springs.

A further object of the invention is to provide an improved construction and arrangement of springs especially adapted for use on vehicles, such as buggies, wagons, or automobiles.

With these and other objects in view the invention consists in the novel construction and arrangement of parts hereinafter described, illustrated in the accompanying drawings, and particularly pointed out in the appended claims.

In the drawings, Figure 1 is a longitudinal sectional elevation of a portion of a buggy and its running-gear, illustrating the application thereto of a pneumatic spring arranged and constructed in accordance with my invention. Fig. 2 is an end elevation of the same. Fig. 3 is a detail sectional view illustrating a pneumatic cushion and a connected spring-pressed fluid-reservoir which may be applied to a variety of uses.

Similar numerals of reference are employed to indicate corresponding parts throughout the several figures of the drawings.

5 and 6 designate, respectively, the front and rear axles of a buggy, said axles being provided with the usual wheels 7. To the top of each axle is secured a transversely-disposed bar 8, the bars of the front and rear axles being connected by reach-bars 9. Near the opposite ends of the bar 8 are vertically-disposed pins 10, secured to said bar, the pins being connected in some cases as by a plate or bar 11, as shown in Fig. 2. The pins 10 pass through suitable openings near the ends of the bar 12 and at their upper ends are threaded for the reception of nuts 13, between which and the top of the bar 12 are compression-springs 14, tending to force the two bars together.

Between the adjacent faces of the two bars, which may be slightly flanged for the purpose, is an elongated cylindrical pneumatic spring 15, formed of a combination of rubber and canvas or other suitable material impervious to the fluid contained therein. The spring or cushion is kept constantly filled with air or other fluid under a pressure sufficient to support the weight of the buggy and its occupants and adapted to yield to inequalities of the road, and this being practically the same effect as would be obtained by the use of pneumatic tires on the wheel-fellies without exposing the cushion to contact with a rough roadway.

In the buggy-body 16, which is supported on bars 17, extending between the two transverse bars 12, is an air-reservoir 18, which may be in the form of a bellows or a cylinder having a movable piston. The bellows is preferably arranged on the floor of the buggy at a point under the seat, and extending over the top thereof are one or more bars 19, the ends of which are secured to the floor of the buggy. Between the lower surface of the bars and the movable top piece of the bellows are a number of compression-springs 20, which serve to keep the air contained within the bellows under pressure. The air-chamber of the bellows is connected by suitable tubes 22 to the pneumatic springs 15 at each end of the running-gear, so that the pressure in each spring will be equal.

On the buggy-seat is placed a cushion 25, which is connected by a tube 27 to the air-chamber of the bellows, and a small cushion 28 is carried by the back-rest 29 and connected to the cushion 25 by a tube 30, or the tube may extend directly to the bellows.

When the device is in use, the weight of the occupants will be yieldingly supported by the several springs or cushions, without, however, increasing the pressure to the extent to which it would be increased if the air were confined within an unyielding reservoir, the mechanical spring being of a previously-determined strength or provided with adjusting-screws 31, as indicated in Fig. 3, to permit yielding when the pressure of air is increased beyond a given point. The construction is such that undue pressure cannot be exerted on the yielding cushions or springs, and thus any strain which would tend to rupture the cushions is avoided, and this pressure may be regulated to any desired extent in accordance with the load or the strength of the springs. The tubes which connect the various sections are made sufficiently small to prevent any very rapid passage of the compressed fluid from one chamber to the other, and thus avoid any sudden collapse of a cushion under a load or strain exerted through accident, while at the same time they are of sufficient size to permit the outflow of air, and thus avoid rupture of the cushion.

In some cases the auxiliary air-chamber may be entirely dispensed with and the pneumatic springs or cushions placed in position and used as vehicle-springs or for the seat-cushion. In such cases the cushions are inflated and then placed in position in the same manner as indicated in Figs. 1 and 2, the connecting-tubes and auxiliary air-chamber being omitted.

In Fig. 3 I have illustrated a slightly different form of reservoir, comprising a two-part casing 18', the springs being provided with adjusting-screws by means of which the pressure may be adjusted, and to this reservoir is connected a cushion or spring which may be employed for any purpose—as, for instance, a cushion for a chair or other seat or for a mattress or a vehicle-spring.

While the construction herein described, and illustrated in the accompanying drawings, is the preferred form of the device, it is obvious that various changes in the form, proportions, size, and minor details of the structure may be made without departing from the spirit or sacrificing any of the advantages of my invention.

Having thus described my invention, what I claim is—

1. The combination with a vehicle, of a plurality of pneumatic cushions forming a yielding support for the body of the vehicle, an equalizing-chamber to which all of said cushions are connected, and mechanical springs tending to compress the air within the chamber and the cushions.

2. The combination with a vehicle, of a plurality of pneumatic cushions forming a yielding support for the vehicle-body, an air-chamber carried by the vehicle-body and serving to contain air under pressure, mechanical springs acting on said chamber to compress air therein, and connecting-tubes extending between the several cushions and the chamber to equalize the pressure, substantially as specified.

3. A vehicle-spring comprising transverse bars carried by the front and rear axles, elongated pneumatic cushions arranged on said bars, auxiliary bars mounted above the cushions and serving to support the body of the vehicle, guides for said auxiliary bars, springs carried by said guides and acting to force the auxiliary bars into contact with the cushion, and an air-chamber carried by the vehicle-body and connected to said cushions.

4. The combination with a vehicle, of a plurality of elongated cushions forming a yielding support for the vehicle-body, a cushion for the occupant, an air-chamber carried by the vehicle-body, connecting-tubes extending between all of the cushions and the air-chamber, and mechanical springs adapted to compress the air within the air-chamber.

5. A vehicle-spring comprising in combination, front and rear bars secured to the vehicle-axles, vertical guiding-rods carried by said bars, upper bars having openings for the reception of the rods, springs carried by said rods and tending to depress the upper bars, means for adjusting the stress of the springs, elongated pneumatic cushions disposed within the upper and lower bars, a cushion for the occupant, an auxiliary back-cushion connected thereto, an air-chamber carried by the vehicle-body and having a movable element, tubes connecting said air-chamber to the several cushions, and mechanical springs acting on said movable element and tending to compress the air within said chamber, substantially as specified.

In testimony that I claim the foregoing as my own I have hereto affixed my signature in the presence of two witnesses.

BURRUS LAFFAYETTE SANDERS.

Witnesses:
J. G. McLEELAN,
W. S. SANDERS.